(No Model.)
W. HERLEHY & J. O. & F. McGINNIS.
NATURAL GAS CARBURETOR.
No. 339,177. Patented Apr. 6, 1886.
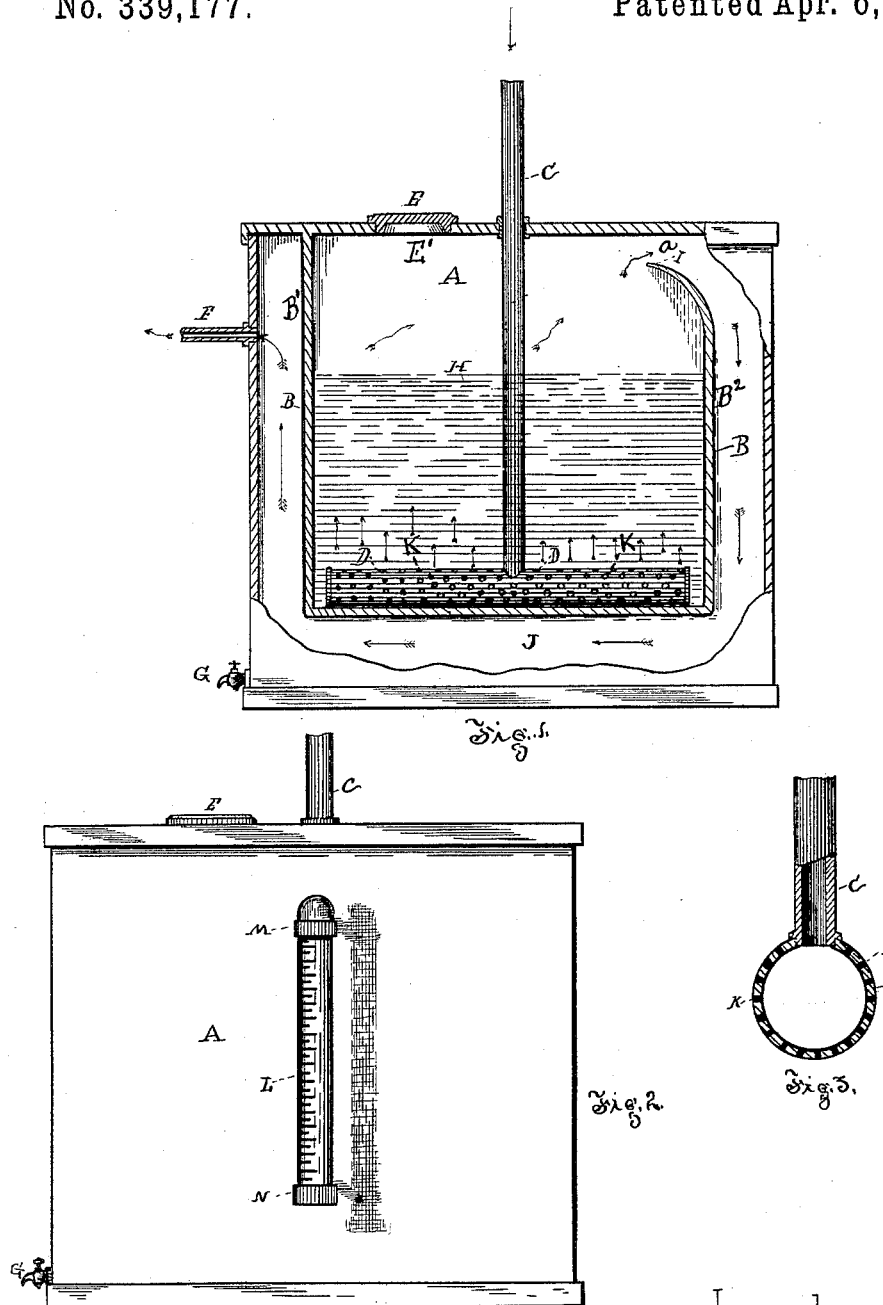

United States Patent Office.

WILLIAM HERLEHY, JAMES O. McGINNIS, AND FRANK McGINNIS, OF PITTSBURG, PENNSYLVANIA.

NATURAL-GAS CARBURETOR.

SPECIFICATION forming part of Letters Patent No. 339,177, dated April 6, 1886.

Application filed May 6, 1885. Serial No. 164,000. (No model.)

*To all whom it may concern:*

Be it known that we, WILLIAM HERLEHY, JAMES O. McGINNIS, and FRANK McGINNIS, all of Pittsburg, in the county of Allegheny and State of Pennsylvania, have invented certain new and useful Improvements in Natural-Gas Carburetors, of which the following is a specification.

The object of our invention is to render natural gas an illuminant, and at the same time cause it to give a steady light.

Practical experience has demonstrated that natural or marsh gas, when not under artificial pressure or its equivalent, will burn with a fluctuating or unsteady light; therefore the nature of our invention consists in constructing the carburetor in two parts, an inner and an outer tank or reservoir, said tanks or reservoirs being so connected at their tops and ends and disconnected at their bottoms and sides as to leave a passage or conduit through which the natural or marsh gas, after being carbureted, is forced by its own pressure the opposite of its natural tendency. In the lower section of the inner tank or reservoir which contains the carbureting compound there is located an inverted-T-shaped perforated head, through which the gas escapes and is forced up through the compound, and is by this means carbureted, and at the same time its fluctuating pressure is overcome, as more fully hereinafter described. We attain these objects by the mechanism illustrated in the accompanying drawings, in which—

Figure 1 is a side elevation partly broken away. Fig. 2 is an end elevation. Fig. 3 is a detached sectional view of the inverted-T-shaped perforated head.

Similar letters refer to similar parts throughout the several views.

The construction and operation of our invention are as follows:

A is the outer tank or reservoir, which is constructed out of any suitable material, being preferably oblong in shape and made perfectly air-tight.

B is the inner tank or reservoir, which is also constructed out of any suitable material and of the same general shape as the outer tank or reservoir, A, being connected to the same on the two opposite ends.

Both the outer and inner tanks or reservoirs have a common top. One of the sides, B', of the inner tank or reservoir, B, is fastened to the top, while the other side, B$^2$, is not connected, but of a bent form at its upper section, as clearly shown at I, Fig. 1. This mode of construction leaves an outlet, $a$, between the inner tank or reservoir, B, and the conduit J. The object of having this side B$^2$ thus formed is to prevent, as far as possible, the liquid compound H from bubbling over into the outer tank or reservoir, A. This formation and connection of the outer and inner tanks or reservoirs, as they have separate bottoms, leaves a conduit, J, Fig. 1, for the passage of the gas after being carbureted.

E is a screw-cap which fits over and air-tightly covers the orifice E' in the top of the inner tank or reservoir, B, and through which the carbureting compound H is introduced into the tank or reservoir.

D is a pipe which extends along near the entire length of the bottom of the inner tank or reservoir, B. This pipe D has numerous orifices or perforations, K, its entire length, as clearly shown in Figs. 1 and 3. To this pipe D is connected at or near its center, and at right angles thereto, a pipe, C, which extends up through the inner tank or reservoir, B, and out through the top of the same, as clearly shown in Fig. 1. This pipe C conveys the natural gas into the tank, and may be connected directly to the main, having the usual stop-cock to regulate the flow of the natural gas. The connection of these two pipes C D in the manner described forms the inverted-T-shaped perforated head or spray device.

H is the carbureting compound through which the natural gas ascends.

The carbureting compound which we preferably design using is composed of seven (7) parts of either benzine, gasoline, or naphthaline to one (1) part of paraffine-oil.

J is the conduit for the carbureted natural gas, and extends around two sides and the bottom of the outer tank or reservoir, A, as clearly shown in Fig. 1, said conduit being formed by the side walls and bottoms of both the outer and inner tanks or reservoirs, A B, its width being the same as that of the outer tank, A.

F is the outlet-pipe, and is located near the top of the side of the outer tank or reservoir, A.

G is a waste-cock which is located at the bottom of the side of the outer tank or reservoir, A, and is used to draw off any of the carbureting compound which may escape from the inner tank or reservoir, B.

M N is an indicator which is attached to the face or end of the outer tank or reservoir, A, being properly connected with the interior of the inner tank or reservoir, B, and registers the amount of the carbureting compound therein, having on its face a graduated scale, L, as clearly shown in Fig. 2, which notes the number of gallons, &c., of the carbureting compound contained in the inner tank or reservoir, B.

The operation is as follows: The carbureting compound H is introduced into the inner tank or reservoir, B, through the orifice E', when the same is closed by means of the screw-cap E. Natural gas is then permitted to flow into the pipe C, and passes down through the same into the perforated pipe D. From this pipe the natural gas escapes through the orifices K, and, passing up through the compound H, is carbureted, becoming ladened with the hydrocarbon contained therein and having its specific gravity thereby increased. The natural gas having an affinity for the heavier hydrocarbons constituting the compound will, as it passes through it, absorb them and become thoroughly impregnated with them, carrying the same with it. The process of carbureting is instantaneous. From the inner tank, B, the carbureted natural gas passes through the outlet $a$ into the conduit J, and round through the same to the outlet-pipe F, as indicated by the arrows in Fig. 1, through which it is discharged. The natural gas is forced by its own pressure down and around the conduit J, the opposite of its natural tendency, and by this means a steady light is furnished.

What we claim as new, and desire to secure by Letters Patent, is—

1. In a natural-gas carburetor, the inner and outer tanks or reservoirs, A B, constructed as described, inverted-T-shaped head or spray C D, constructed as described, carbureting compound H, and avenue or conduit J, the whole combined and arranged to operate substantially as described.

2. In a natural-gas carburetor, the inner and outer tanks or reservoirs, A B, constructed as described, inverted-T-shaped head C D, constructed as described, carbureting compound H, avenue or conduit J, and indicator M N, the whole constructed, combined, and arranged to operate substantially as described.

WILLIAM HERLEHY.
JAMES O. McGINNIS.
FRANK McGINNIS.

Witnesses:
MATTHEW MAWHINNEY,
OTTO HAUCK.